United States Patent [19]

Marchionni et al.

[11] Patent Number: 5,000,830
[45] Date of Patent: Mar. 19, 1991

[54] PROCESS FOR THE PRODUCTION OF PERFLUOROPOLYETHERS SUBSTANTIALLY CONSTITUTED BY PERFLUOROOXYETHYLENE AND PERFLUOROOXYPROPYLENE UNITS

[75] Inventors: Giuseppe Marchionni, Milan; Ugo De Patto, Cogliate, both of Italy

[73] Assignee: Ausimont S.R.L., Milan, Italy

[21] Appl. No.: 352,987

[22] Filed: May 17, 1989

[30] Foreign Application Priority Data

May 20, 1988 [IT] Italy .................. 20649 A/88

[51] Int. Cl.$^5$ .................. B01J 19/12; C02F 1/32
[52] U.S. Cl. .................. 204/157.92; 204/157.94; 204/158.12; 568/601; 568/416
[58] Field of Search .................. 568/601, 416; 204/157.92, 157.94, 158.11, 158.12

[56] References Cited

U.S. PATENT DOCUMENTS 3,665,041  5/1972  Sianesi et al. .................. 252/54
3,770,792 11/1973  Sianesi et al. .................. 252/54
4,664,766  5/1987  Marchionni et al. .......... 204/157.92

Primary Examiner—John F. Niebling
Assistant Examiner—Arun S. Phasge
Attorney, Agent, or Firm—Morgan & Finnegan

[57] ABSTRACT

Improved process for producing perfluoropolyethers prevailingly constituted by repeating units $$-CF_2CF_2O-$$

and

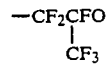

with perfluoroalkyl terminal groups, wiith a mutual ratio of the above $C_3/C_2$ units comprised within the range of from 0.2 to 6, endowed with an optimum combination of chemical-physical properties, prepared by means of a process of photo-oxidation of $C_3F_6+C_2F_4$, under controlled conditions.

4 Claims, No Drawings

PROCESS FOR THE PRODUCTION OF PERFLUOROPOLYETHERS SUBSTANTIALLY CONSTITUTED BY PERFLUOROOXYETHYLENE AND PERFLUOROOXYPROPYLENE UNITS

DISCLOSURE OF THE INVENTION

The present invention relates to the production of perfluoropolyethers prevailingly constituted by repeating $$-CF_2CF_2O-$$

and $$-CF_2CFO\ |\ CF_3$$

units, endowed with an optimum combination of desirable chemical-physical properties.

The process for producing them is based on the low-temperature photo-oxidation of perfluoropropene and tetrafluoroethylene mixed with each other, the subsequent decomposition of the peroxidic products, the fluorination of the terminal groups in order to convert them into perfluoroalkyls, and optionally the possible regulation of the molecular weight in case this latter is too high in view of the expected used of the end product.

The various steps of the process are based on individually well-known technologies. However, the products according to the present invention are the result of the application of specific operating conditions which make it possible for them to be produced, at economically favorable costs, and with high yields relative to the perfluoroolefins used.

Photo-oxidation of the $C_2F_3+C_3F_6$ mixture is known from U.S. Pat. No. 3,442,942; U.S. Pat. No. 3,665,041; DOS 1,817,826; and U.S. Pat. No. 3,770,782.

The relevant testing as reported in these patents had not led to the taking into consideration of the specific operating conditions which, according to the present invention, are essential in order to obtain the above products with high yields and high conversions relative to the perfluoroolefins used as the starting materials. More particularly, the products disclosed in the examples reported in the above patents show a rather low ratio of $C_2$ units to $C_3$ units.

According to the present invention, however, by adopting in the photo-oxidation of the $C_2F_4+C_3F_6$ mixture specific operating conditions, then decomposing the peroxy groups and converting the terminal groups into perfluoroalkyl groups by means of special methods, perfluoropolyethers are obtained, which have the general formula:

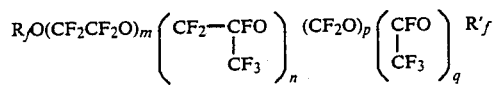

wherein:
  $R_f$ and $R'_f$ are terminal perfluoroalkyl groups selected from: $-CF_3$, $-C_2F_5$, $-C_3F_7$; and
  m, n, p and q are indexes which represent average values for the products in question, which are generally constituted by mixtures of individual compounds within the scope of the above formula, meeting the following requisites:
  the sum of m+n+p+q is within the range of from 2 to 200;
  the ratio of (p+q)/(m+n+p+q) is smaller than, or equal to, 10:100, and is preferably within the range of from 0.5/100 to 4/100;
  the ratio of n/m is within the range of from 0.2 to 6, and preferably from 0.5 to 3; and
  m, n, p and q are the same of different an wherein m and n are between 1 and 100, and preferably between 1 and 80, and p and q are between 0 and 80, and preferably between 0 to 50.

The products according to the present invention are characterized, relative to the products known from the prior art, by the following properties;
  a very low content of $-CF_2O-$ units, which are known to constitute points of breakage of the perfluoropolyether chain. As a consequence, the products of this invention have a high stability with respect to catalytic breakdown;
  a high value of the ratio of n/m, which involves, as compared to the products known from the prior art, with a higher content of $C_3$ units, and a decidedly lower viscosity, with the molecular weight being the same. This means the availability of products having a low viscosity even at very low temperatures, and at the same time an extremely low vapor pressure owing to their high molecular weight. Furthermore, their pour point is lower, with the molecular weight being the same, which means having available low-pour-point, low volatility products.

With the process according to the present invention, applicants unexpectedly discovered that yields of $C_2F_4$ into perfluoropolyether oil are obtained which are much higher than those of the prior art, and are generally of the order of 90%.

It may be observed in particular that, as compared to the perfluoropolyethers obtained by means of the photooxidation of $C_2F_4$ alone, not containing $C_3$ units, like the Montidison's products Fomblin ® Z, the products according to the present invention shown a much smaller content of $-CF_2O-$ groups, and therefore a much higher stability.

Furthermore, the preparation is simpler from a technical viewpoint, and cheaper, in that it does not require the use of reaction solvents, which are required, on the contrary, in the case of photo-oxidation of $C_2F_4$ alone.

From the above U.S. Pat. No. 3,770,782 to Sianesi, it is known to prepare PFPE products containing both $-CF_2CF_2O-$ and $-CF(CF_3)CF_2O-$ units by means of the simultaneous photochemical oxidation of $C_2F_4$ and $C_3F_6$. Under such operating conditions as stated or suggested by the above patent, and, in particular, as resulting from the examples, very high values of the conversions, and of the yields to useful products are not obtained. The highest values of the yields, which may be inferred from the examples, are 70% relative to $C_2F_4$ and 60% relative to $C_2F_6$, whilst conversions are, at maximum, 60% relative to $C_2F_4$ and 15% relative to $C_3F_6$.

In particular, as regards the UV light which constitutes a key factor of the process, the Sianesi patent suggests (in order to obtain a product not containing an excessively large amount of peroxy oxygen) by operating under such conditions that the irradiation index I, as defined below is at least 2, and preferably at least 3, and up to 50. The irradiation index I is represented by the formula:

$$I = \frac{100 \cdot E}{S^{\frac{1}{2}} \cdot V^{\frac{1}{2}}} \text{ (watt/cm}^2\text{)}$$

wherein:
 E = UV energy at a wavelength of $\leq 3,300$ Å as watts,
 S = the surface through which the energy E penetrates the system, a cm$^2$, and
 V = the volume, as cm$^3$, of the reaction system.

From the examples reported in the Sianesi patent, values of I around 6 result. In Example 9, it is shown how a low I value of 1.4 for the irradiation index corresponds to a high content of peroxy oxygen.

It has now, surprisingly, been discovered (in accordance with the present invention) that the yields and the conversions may be considerably improved as compared to the results obtained by Sianesi, with yield values being obtained which are higher than 90% for the yield relative to $C_2F_4$, and simultaneously yields of approximately 90% for the yield relative to $C_3F_6$, while achieving conversions higher than 60% for $C_2F_4$, and of the order of 15%, and even higher, for $C_3F_6$.

EXAMPLES

These results were reached by adopting optimum operating conditions, which are characterized, in particular, by specific values of the intensity of the UV light, as referred to the volume of the liquid phase in the reaction, and to the flow rate of the gaseous reactants ($O_2$, $C_2F_4$, $C_3F_6$) which are fed as a continuous stream to the reaction zone.

On regarding as the radiant energy E, useful for the photochemical effects in the reaction, that energy which corresponds to radiations having a wavelength of $\leq 3,000$ Å, it was found that the intensity of the same radiation, as referred to both the volume of the liquid phase in the reaction $V_{liq}$ and to the flow rate Fg for the continuously fed reactants in the gaseous state ($O_2$, $C_2F_4$, and, possibly, $C_3F_6$), must need the following conditions:

(a) $E/V_{liq}$ is within the range of from 15 to 150, and preferably from from 20 to 100, wherein E is expressed as watts and $V_{liq}$ is expressed as dm$^3$.

(b) E/Fg is within the range of from 0.15 to 1.55, wherein E is expressed as watts, and Fg is expressed as liters/hour (l/h) of $C_2F_4+O_2(+C_3F_6)$.

Another important parameter is the value of the gas flow rate Fg, with reference to the volume of the liquid phase in the reaction $V_{liq}$. Such value is interdependent with the above (a) and (b) parameters, and should be such that:

(c) $V_{liq}/Fg$ is within the range of from $10 \cdot 10^{-3}$ to $25 \cdot 10^{-3}$, and preferably from $10 \cdot 10^{-3}$ to $17 \cdot 10^{-3}$, with $V_{liq}$ being expressed as dm$^3$ and Fg as l/h.

It clearly appears that the operating conditions for the process according to the present invention are significantly different from those for the process as disclosed and exemplified in the Sianesi patent, owing to a considerably higher intensity of radiation, as referred to the reaction volume (liquid phase) and the flow rate of the gaseous reactants. Furthermore, the flow rate of the gaseous reactants, as referred to the reaction volume (liquid phase) is maintained at lower values.

It was not possible to predict that, by adopting a specific radiation intensity, as referred to both the volume of the reactant liquid phase, and to the flow rate of the gaseous reactants, which is much greater than as generally adopted in processes known from the prior art, and that besides the conversions also the yields to useful products could be substantially improved.

The reactant liquid phase contained inside the reactor is exposed to the UV light emitted by a lamp of per se known type, with a wavelength comprised within the range of from 2,000 to 6,000 Å.

The other operating conditions of the process according to the present invention fall within the scope of the processes known from the above patent to Sianesi, and still other commonly owned patents.

The reaction is carried out at a temperature within the range of from $-30°$ to $-100°$ C., by bubbling the gaseous reactants $O_2$ and $C_2F_4$, and possibly also $C_3F_6$, through the reaction liquid initially constituted by liquified $C_3F_6$ with the liquid products formed during the reaction.

The gaseous mixture of $O_2+C_2F_4$ is continuously fed, and the molar ratio of $O_2/C_2F_4$ is within the range of from 1 to 10, and, preferably, from 3 to 9.

The reactant mixture is maintained at a temperature within the range of from $-30°$ to $-100°$ C., and preferably from $-40°$ to $-80°$ C.

The reaction may be carried out under atmospheric pressure, but it may be carried out under pressures lower than, or higher than, atmospheric pressure.

The product of the photo-oxidation, containing peroxy oxygen, and having a very high molecular weight (i.e., a high viscosity), as referred to the end product for the usual ones, undergoes a thermal or photochemical treatment for the elimination of the peroxy groups according to such operating techniques as per se known, e.g., from GB Pat. No. 1,226,566. The fluorination of the terminal groups is then carried out with fluorine gas at temperatures within the range of from 100° to 250° C., if desired possibly in the presence of UV light at temperatures within the range of from 50° to 120° C. (see U.S. Pat. No. 4,664,766).

The thermal decomposition of the peroxide may be only partial, with the residual peroxy oxygen being eliminated during the subsequent fluorination step (see U.S. Pat. No. 4,664,766), with a controlled reduction in molecular weight being thus obtained, as disclosed in U.S. Pat. No. 4,668,357.

The regulation of the molecular weight may also be accomplished by means of a thermal catalytic cracking treatment at a temperature of from 150° to 380° C., in the presence of $AlF_3$ or of other catalytic fluorides or oxyfluorides or oxides, as disclosed in European patent applications Nos. 167,258; 224,201; and 223,238; followed by fluorination with fluorine gas as above mentioned, in order to convert the oxygen-containing terminal groups into neutral perfluoroalkyl groups.

The thermal catalytic cracking treatment furthermore decreases the content of —$CF_2O$— units present in the starting product, with an end product hence being obtained which contains a minimum number of such units.

The peroxy product from the photo-oxidation may be directly subjected to thermal treatment with catalytic cracking as above indicated.

The following examples are supplied for the purpose of merely illustrating the invention, but without limiting it.

EXAMPLE 1

To a glass reactor of cylindrical shape (with a volume of 500 ml, and an optical path of 1 cm) provided with an inner coaxial sheath of quartz, and furthermore provided with a dip tube for the introduction of gases, with a sheath with a thermocouple for detecting the inner temperature, and with a reflux condenser maintained at the temperature of $-80°$ C., 800 g of $C_3F_6$ at the temperature of $-60°$ C. was charged. Through the dip tube, into the reactor a gaseous mixture was bubbled, which consisted of 27 l/h of $O_2$ and 9 l/h of $C_2F_4$. By means of a refrigerating bath placed externally of the reactor, the temperature of the liquid reactant phase was maintained at $-60°$ C. throughout the test.

After introducing inside the quartz sheath an UV-light lamp of HANAU TQ 150 type (which emits 47 watts of UV light having a wavelength within the range of from 2000 to 6000 Å and 12 W of energy corresponding to the radiations at $\leq 3,000$ Å), said lamp was turned on, and the irradiation and the feed of both reactant gases were maintained for 5 hours.

After 5 hours of irradiation, the lamp was turned off, the reactor was vented, and from the reactor the unreacted $C_3F_6$ was recovered by evaporation at room temperature. An oily polymeric residue of 420 g was thus obtained. Such residue showed, upon iodometric titration, a content of active (peroxy) oxygen of 2.75%. Upon $^{19}F$-NMR investigation, it was shown to be constituted by polyether-polyperoxy chains, wherein the mutual ratio of the total constituting units: $C_3F_6/C_2F_4$ was 0.85, the ratio of $CF_2C_3F_6+C_2F_4$ was 0.019, and the average number molecular weight was 6630.

The viscosity of the product was 983 cSt at 20° C., as determined with an OSTWALD-FENSKE viscometer.

The yield referred to $C_2F_4$ in the obtained oil is 93%.

The results of Examples 1–8 are summarized below in Table 1.

EXAMPLE 2

By using the same equipment as in Example 1, photosynthesis was carried out under the same conditions of temperature and intensity of irradiation at those of Example 1, but the flow rate of $C_2F_4$ was varied. In this case, 3 l/h of TFE were fed. After 5 hours of reaction, rom the reactor 213 g was discharged a polymer which upon iodometric titration showed a content of active oxygen of 0.7%. Upon $^{19}F$-NMR investigation, the polymer turned out to be constituted by polyether-polyperoxy chains wherein the ratio of $C_3F_6/C_2F_4$ was 2.11, the ratio of $CF_2/C_3F_6+C_2F_4$ was 0.063, and its average number molecular weight was 5700.

The viscosity of the product turned out to be 955 cSt at 20° C.

EXAMPLE 3

By using the same equipment as in Example 1, a photosynthesis was carried out under the same conditions of temperature, flow rate of $O_2$, and flow rate of $C_2F_4$ as in Example 2, but the intensity of the lamp was reduced. In this case, an emission of UV radiations was used which had wavelengths within the range of from 2,000 to 6,000 Å of 33 watts, and 8.5 W for 3,000 wavelength.

After 5 hours of reaction, from the reactor 147 g there was recovered a polymer which, upon $^{19}F$-NMR analysis was shown to be constituted by polyether-polyperoxy chain wherein the ratio of the $C_3F_6/C_2F_4$ units was 0.74, the ratio of $CF_2/C_3F_6+C_2F_4$ was 0.0112, and the average number molecular weight was 12,000.

Upon the iodometric analysis, the product showed a content of 3.86% of active oxygen, and a viscosity of 5330 cSt at 20° C.

EXAMPLE 4

By using the same equipment as in Example 1, a photosynthesis was carried out under the same conditions of temperature and intensity of irradiation as those of Example 1, but the flow rate of the reactants were varied. In this case, 5 l/h of $C_2F_4$ and 31 l/h of $O_2$ were fed. After 5 hours of reaction, from the reaction 338 g there was discharged a polymer which upon iodometric analysis was shown to have a content of active oxygen of 1.9%.

The viscosity of the product was 637 cSt at 20° C.

The $^{19}F$-NMR analysis showed that the polymer was constituted by polyether-polyperoxy chains wherein the ratio of the $C_3F_6/C_2F_4$ units was 1.18, the ratio of $CF_2/C_3F_6+C_2F_4$ was 0.027, and the average number molecular weight of which was 5200.

EXAMPLE 5

By using the same equipment as in Example 1, a photosynthesis was carried out under the same conditions as those of Example 1, but at the temperature of $-40°$ C. In this case, after 5 hours of reaction, from the reactor 488 g was discharged a polymer which, upon iodometric analysis, was shown to have a content of active oxygen of 1.9%.

The viscosity of the product was 210 cSt at 20° C.

The $^{19}F$-NMR analysis showed that the polymer was constituted by polyether-polyperoxy chains wherein the ratio of the $C_3F_6/C_2F_4$ units was 1.17, the ratio of $CF_2/C_3F_6+C_2F_4$ was 0.032, and the average number molecular weight was 3000.

The yield of $C_2F_4$ in the obtained oil was 89%.

EXAMPLE 6

By using the same equipment as in Example 1, a photosynthesis was carried out under the same conditions as those of Example 2, but at a temperature of $-40°$ C. After 5 hours of reaction, from the reactor 479 g was discharged a polymer which, upon iodometric analysis, showed a content of active oxygen of 0.92%.

The viscosity of the product was 188 cSt at 20° C.

The $^{19}F$-NMR analysis showed that the polymer was constituted by polyether-polyperoxy chains wherein the ratio of the $C_3F_6/C_2F_4$ units was 1.91, and ratio of $CF_2/C_3F_6+C_2F_4$ was 0.038, and the average number molecular weight of which was 3300.

EXAMPLE 7

By using the same equipment as in Example 1, a photosynthesis was carried out under the same conditions as in Example 3, but at a temperature of $-40°$ C.

The radiation energy at a wavelength of $\leq 3,000$ Å was 8.5 W.

After 5 hours of reaction, 265 g of a polymer was discharged which, upon iodometric analysis, revealed a content of active oxygen of 1.47%.

The viscosity of the product was 504 cSt at 20° C.

The $^{19}F$-NMR analysis showed that the polymer was constituted by polyether-polyperoxy chains, wherein the ratio of the $C_3F_6/C_2F_4$ units was 1.47, the ratio of $CF_2/C_3F_6+C_2F_4$ was 0.021, and the average number molecular weight was 4,200.

EXAMPLE 8

By using the same equipment as in Example 1, a photosynthesis was carried out under the same conditions as in Example 4, but at a temperature of $-40°$ C.

After 5 hours of reaction, 453 g of a polymer was discharged which, upon iodometric analysis, showed a content of active oxygen of 1.26%.

The viscosity of the product was 226 cSt at 20° C.

The $^{19}$F-NMR analysis showed that the polymer was constituted by polyether-polyperoxy chains wherein the ratio of the $C_3F_6/C_2F_4$ units was 0.024, and the average number molecular weight was 3400.

EXAMPLE 9

A stainless-steel reactor of cylindrical shape was used, which was equipped with a coaxial quartz sheath, wherein the ratio of $E/V_{liq}$ was $=80$, the ratio of $E/F_g$ was $=0.88$, and the ratio of $V_{liq}/F_g$ was $=11 \times 10^{-3}$.

The reaction is started with an initial charge of liquid $C_3F_6$ inside the reactor. During the reaction, a flow rate of the reactant gases is maintained which is 2,730 l/h for $O_2$, and 1,344 l/h for $C_2F_4$.

The reaction was carried out for 42 hours. The reaction product was continuously discharged, and $C_3F_6$ was replenished in such a way as to maintain a constant concentration of the oil inside the reactor.

The data relevant to the operating conditions are reported in Table 1.

In the same table, the data are reported for comparative purposes, which is obtained from the Examples of the above cited U.S. Pat. No. 3,770,792 to Sianesi.

EXAMPLE 10

The product obtained in Example 4 was charged to a photochemical reactor and was subjected to a photoreduction in order to eliminate the peroxy power (P.O.), at the temperature of 40° C. After 12 hours, 321 g of polymer was discharged and was then charged to a photochemical reactor and subjected to a photo-assisted fluorination at a temperature of 50° C. (5l/h of fluorine and 5 l/h of nitrogen). After 10 hours, 314 g of a neutral product was discharged (yield of 95%). The distillation of the neutral product under vacuum made it possible to obtain four fractions, A, B, C and D, which had the characteristics as reported below in Table 2.

The ratios of $C_3F_6O/C_2F_4O$ are, respectively:
for A=1.13; for B=1.42 for C=1.32; for D=1.20.
The ratio of $C_3F_6O/CF_2O$ is as follows:
for A=14.2; for B=15.5; for C=14.0; for D=11.9;
The ratio of $C_2F_4O/CF_2O$ is as follows:
for A=12.5; for B=10.9; for C=10.2; for D=9.8.
From this data, one may easily compute the ratio of $$\frac{CF_2O}{C_3F_6O + C_2F_4O}$$

which turns out to be:
for
A=3.74%, for B=3.79%, for C=4.22%; and for D=4.64%.

For comparative purposes, in Table 3 below the characteristics of Fomblin ® Y and Z (commercial products) are reported.

TABLE 1

| | | | Flowrate, l/h | | | Produced | Average Molecular | Peroxy Power | |
|---|---|---|---|---|---|---|---|---|---|
| | $O_2$ | $C_3F_{g6}$ | $O_2$ | $C_2F_4$ | Time (h) | Oil (g) | Weight | (P.O.) | $C_3/C_2$ |
| Example | | | | | | | | | |
| 1 | −60 | 800 | 27 | 9 | 5 | 420 | 6,636 | 2.75 | 0.85 |
| 2 | −60 | 800 | 27 | 3 | 5 | 213 | 5,700 | 0.7 | 2.11 |
| 3 | −60 | 800 | 27 | 3 | 5 | 147 | 12,000 | 3.86 | 0.74 |
| 4 | −60 | 800 | 31 | 5 | 5 | 338 | 5,200 | 1.9 | 1.18 |
| 5 | −40 | 800 | 27 | 9 | 5 | 448 | 3,000 | 1.74 | 1.17 |
| 6 | −40 | 800 | 27 | 3 | 5 | 279 | 3,300 | 0.92 | 1.91 |
| 7 | −40 | 800 | 27 | 3 | 5 | 165 | 4,200 | 2.1 | 1.47 |
| 8 | −40 | 800 | 31 | 5 | 5 | 453 | 3,400 | 1.26 | 1.83 |
| 9 | −60 | 449,000 | 2,730 | 1,344 | 42 | 798,000 | 4,000 | 1.05 | 1.1 |
| SIANESI | | | | | | | | | |
| Example 2 | −50 | 700 | 40 | 20 | 2 | 198 | 10,000 | 2.2 | 0.83 |
| Example 3 | −50 | 700 | 80 | 20 | 2 | 220 | 12,000 | 3.2 | 0.58 |
| Example 5 | −40 | 700 | 40 | 20 | 2 | 158 | 8,000 | 0.95 | 0.53 |
| Example 9 | −40 | 700 | 40 | 20 | 2 | 26 | 15,000 | 5.00 | 0.82 |

| | Recovery, g | | Yield % | | Conversion, % | | | | |
|---|---|---|---|---|---|---|---|---|---|
| | $C_2F_4$ | $C_3F_6$ | $C_2$ | $C_3$ | $C_2$ | $C_3$ | $E/V_{liq}$ | $E/F_g$ | $V_{liq}/F_g/10^{-3}$ |
| Example | | | | | | | | | |
| 1 | 34 | 585.8 | 98 | 97 | 81.7 | 26.7 | 24 | 0.33 | 13.88 |
| 2 | 19.9 | 642.8 | 97 | 92 | 68.2 | 18.0 | 24 | 0.4 | 16.66 |
| 3 | 0 | 725 | 92 | 90 | 91.2 | 8.5 | 16.8 | 0.28 | 16.66 |
| 4 | 0 | 590 | 97.5 | 90 | 97.5 | 23.7 | 24 | 0.33 | 13.88 |
| 5 | 37.3 | 497 | 96 | 91 | 78.5 | 34.5 | 24 | 0.33 | 13.88 |
| 6 | 0 | 593 | 96 | 90 | 95.8 | 23 | 24 | 0.4 | 16.66 |
| 7 | 19.1 | 689.4 | 93 | 91 | 66.5 | 12.3 | 16.8 | 0.28 | 16.66 |
| 8 | 0 | 483.3 | 97 | 93 | 96.7 | 36.2 | 24 | 0.33 | 13.88 |
| 9 | 3,000 | 6,000 | 96 | 90 | 95 | 88 | 80 | 0.88 | 11 |
| SIANSEI | | | | | | | | | |
| Example 2 | 30 | 545 | 58 | 61 | 43.2 | 13.8 | 7.76 | 0.056 | 7.3 |
| Example 3 | 28 | 490 | 69 | 43 | 57.9 | 12.9 | 7.76 | 0.034 | 4.38 |
| Example 5 | 33 | 510 | 53 | 32 | 43.3 | 8.7 | 7.76 | 0.056 | 7.3 |

TABLE 1-continued

| | | | | | | | | |
|---|---|---|---|---|---|---|---|---|
| Example 9 | — | — | — | — | 6 | 2 | 2.05 | 0.015 | 7.3 |

NOTE:
In Example 9, the amount of $C_3F_6$ corresponds to the initial charge, plus the periodic additions of $C_3F_6$.

TABLE 2

| Property | PFPE A | B | C | D |
|---|---|---|---|---|
| Molecular weight | 1,900 | 3,200 | 4,000 | 6,200 |
| Kinematic viscosity (20° C., cSt) | 29 | 124 | 247 | 900 |
| Viscosity Index | 103 | 137 | 145 | 190 |
| Pour Point (°C.) | −62 | −44 | −38 | −33 |
| Density (20° C., g/ml) | 1.85 | 1.86 | 1.86 | 1.87 |
| Refractive Index ($n^{20}$) | 1.289 | 1.295 | 1.297 | 1.298 |
| Surface tension (dyne/cm) | 22 | 23 | 22 | 24 |
| Volatility (149° C. 22 hV) WE/LON | 16.4 | 0.9 | 0.3 | 0.1 |
| Tg (°C.) | −93.5 | −86 | −81 | −77 |
| Vapor pressure at 20° C. (torr.) | $2.7 \times 10^{-5}$ | $7.9 \times 10^{-8}$ | $-3.7 \times 10^{-8}$ | $-9.1 \times 10^{-11}$ |

TABLE 3

| Property | SERIES Y PFPE | | | | | SERIES Z PFP | | |
|---|---|---|---|---|---|---|---|---|
| Molecular weight | 1,800 | 2,500 | 3,300 | 4,100 | 6,600 | 3,900 | 7,850 | 9,400 |
| Kinematic viscosity (20° C., cSt) | 60 | 140 | 270 | 450 | 1,350 | 29.2 | 148 | 255 |
| Viscosity Index | 70 | — | 108 | 117 | 130 | 317 | 320 | 355 |
| Pour Point (°C.) | −50 | −45 | −35 | −30 | −20 | −90 | −80 | −66 |
| Density (20° C. g/ml) | 1.88 | 1.89 | 1.900 | 1.902 | 1.913 | 1.824 | 1.841 | 1.851 |
| Refractive Index ($n^{20}$.) | 1.295 | 1.296 | 1.300 | 1.301 | 1.302 | 1.290 | 1.293 | 1.294 |
| Surface Tension (dyne/cm) | 21 | 22 | 22 | 23 | 24 | 23 | 24 | 25 |
| Volatility (149° C., 22 hv) WE/LON | 5 | 5 | 5 | 5 | 1 | 7.3 | 0.7 | 0.03 |
| Vapor Pressure at 20° C. (torr.) | | | | | | | $1.6-10^6$ | $2.9-10^{-12}$ |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

What is claimed is:

1. Process for preparing perfluoro-polyethers having the formula:

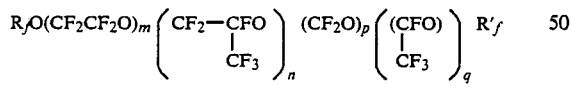

wherein:

$R_f$ and $R'_f$ are terminal perfluoroalkyl groups selected from the class consisting of $-CF_3$, $-C_2F_5$, $-C_3F_7$; and m, n, p and q indexes, which represent average values for the products in question, generally constituted by mixtures of individual compounds within the scope of the above formula, and meeting the following requisites:

the sum of m+n+p+q is within the range of from 2 to 200;

the ratio of (p+q)/(m+n+p+q) is smaller than, or equal to 10/100;

the ratio of n/m is within the range of from 0.2 to 6; and m, n, p, and q are the same or different and wherein m and n are between 1 and 100, p and q are between 0 and 80, comprising the following steps:

(a) photo-oxidation of the mixture of $C_3F_6+C_2F_4$, carried out by sending a gaseous stream of $O_2+C_2F_4$, with a molar ratio within the range of from 1 to 10, into a liquid reaction phase initially constituted by $C_3F_6$, maintained at a temperature within the range of from −30° to 100° C., and irradiated with UV light;

(b) optional treatment selected between:

(I) thermal or photochemical treatment of the product from the photooxidation, to totally or partially eliminate peroxy groups; and (II) thermal catalytic treatment of the product from the photooxidation, at 150°-380° C. in the presence of $AlF_3$ or other fluorides or oxyfluorides or oxides endowed with catalytic activity; and (c) treatment of fluorination with fluorine gas at a temperature within the range of from 100° to 250° C., or from 50° to 120° C. in the presence of UV light, to convert the terminal groups into perfluoroalkyl groups, and to eliminate any possible presence of peroxy groups, said process being furthermore characterized in that the intensity of the radiation used in the (a) step, referred to the energy emitted as radiations at =3,000 Å, to the volume of the liquid reaction phase $V_{liq}$, and to the flow rate of the reactant gases $F_g$, fulfills the following conditions:

$E/V_{liq}$ within the range of from 15 to 150;

$E/F_g$ within the range of from 0.15 to 1.55;

$V_{liq}/F_g$ within the range of from $10.10^{-3}$ to $25.10^{-3}$, wherein:

E = energy, expressed in watts;

$V_{liq}$ is expressed as $dm^3$;

$F_g$ is expressed as l/h.

2. Process for preparing perfluoropolyethers according to claim 1, wherein the (b) and (c) steps are carried out simultaneously.

3. Process for preparing perfluoro-polyethers according to claim 1, wherein the ratio of (p+q)/(m+n+p+q) is within the range of from 0.5/100 to 4/100.

4. Process for preparing perfluoro-polyethers according to claim 1, wherein the ratio of n/m is within the range of from 0.5 to 3.

* * * * *